Oct. 27, 1959　　　D. W. HAYES　　　2,910,183
STRAINER
Filed May 31, 1955　　　　　　　　　3 Sheets-Sheet 1
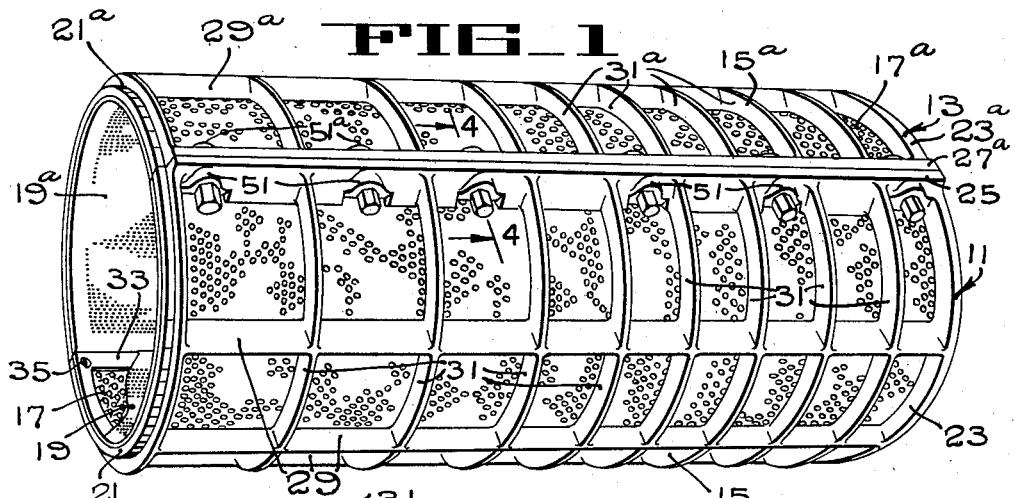
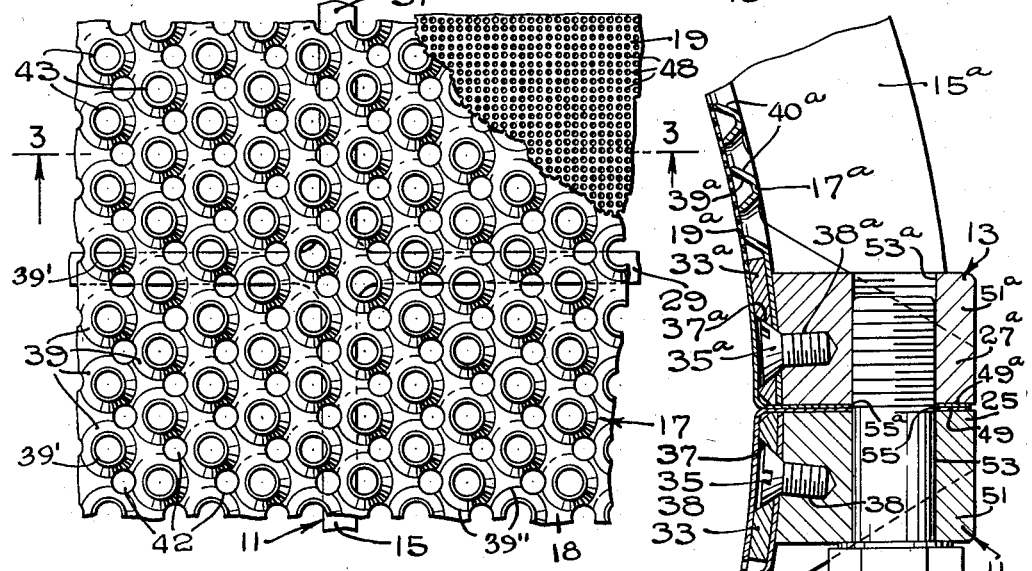
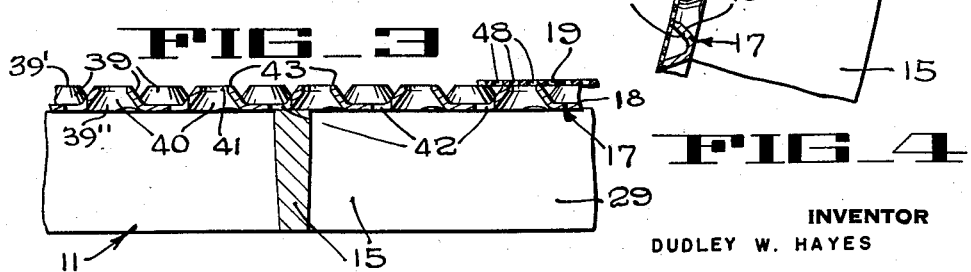
INVENTOR
DUDLEY W. HAYES
BY *Hans G. Hoffmeister*
ATTORNEY Oct. 27, 1959 D. W. HAYES 2,910,183
STRAINER
Filed May 31, 1955 3 Sheets-Sheet 2
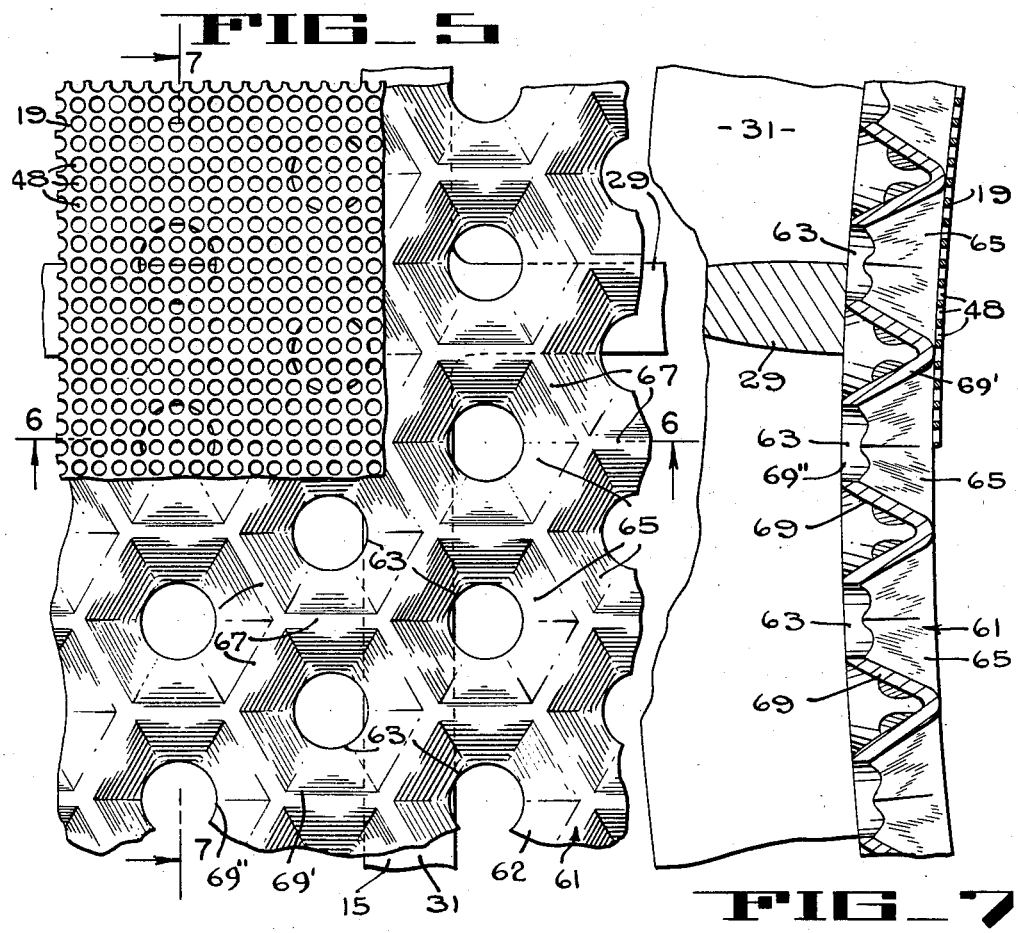
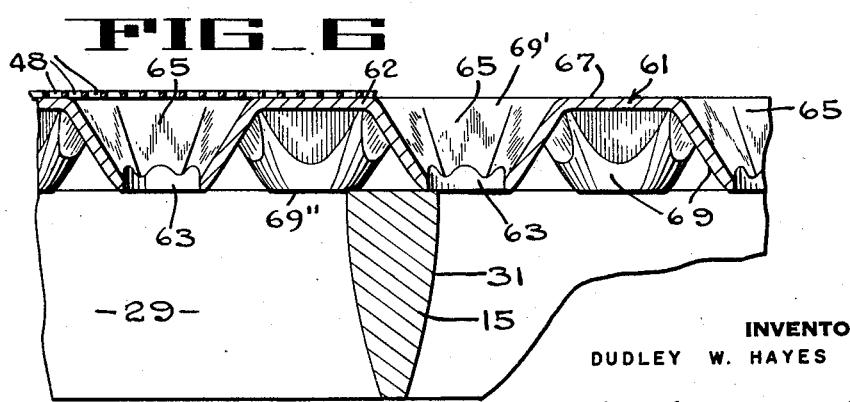
INVENTOR
DUDLEY W. HAYES
BY Hans G. Hoffmeister
ATTORNEY Oct. 27, 1959  D. W. HAYES  2,910,183
STRAINER
Filed May 31, 1955  3 Sheets-Sheet 3
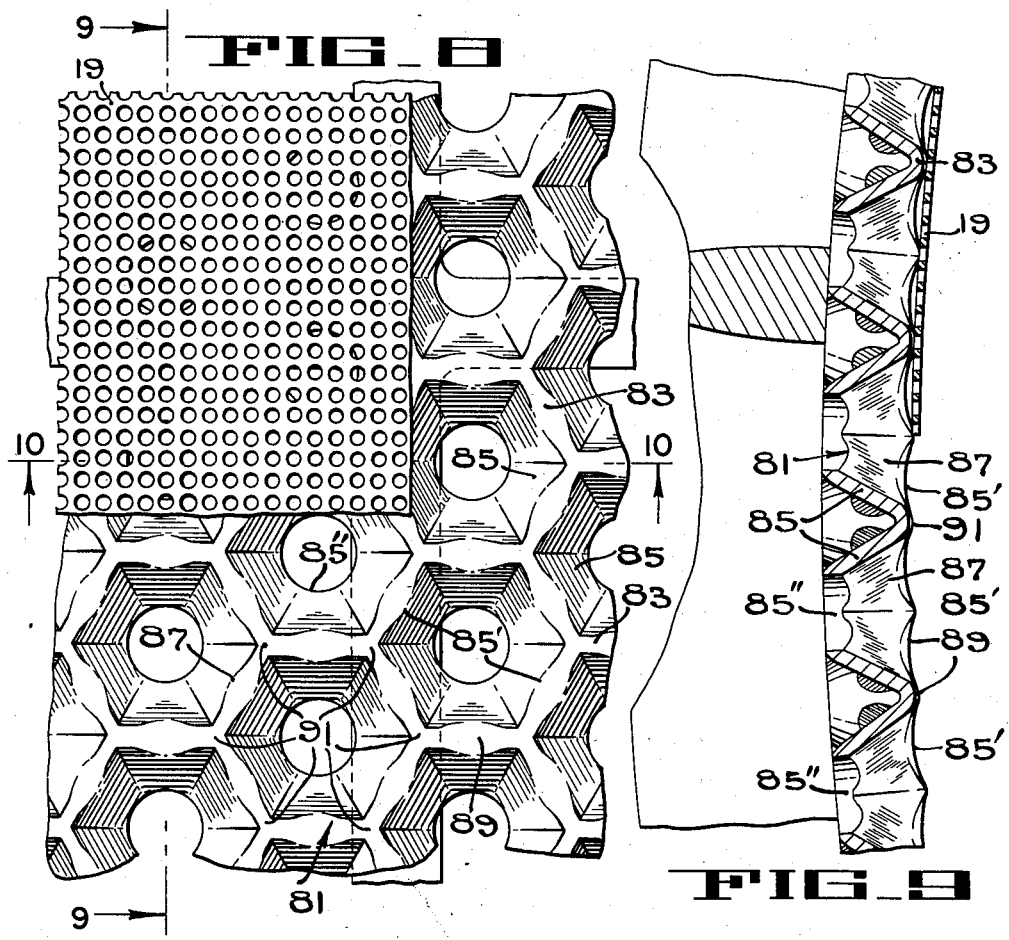
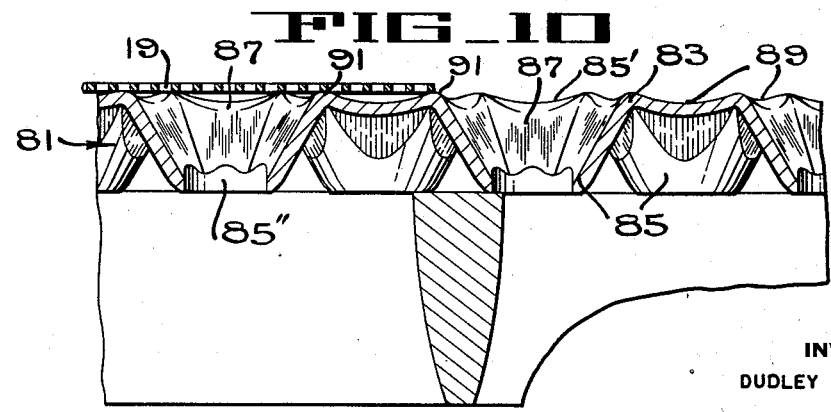
INVENTORS
DUDLEY W. HAYES
BY Hans G. Hoffmeister
ATTORNEY United States Patent Office 2,910,183
Patented Oct. 27, 1959

2,910,183
STRAINER

Dudley W. Hayes, San Jose, Calif., assignor to Food Machinery and Chemical Corporation, San Jose, Calif., a corporation of Delaware Application May 31, 1955, Serial No. 511,820

1 Claim. (Cl. 210—315)

The present invention relates to strainers, and more particularly to multiple element strainers of the type including a filter screen and a supporting element therefor.

This is a continuation-in-part of U.S. patent application Serial No. 446,590, filed July 29, 1954, now abandoned.

One object of the present invention is to provide a new and improved strainer.

Another object is to provide a multiple element strainer having a considerably greater unobstructed area for the passage of the filtrate than the strainers presently known in the art.

Another object is to provide a strainer for use in a high pressure separator which will reduce the power requirements of the separator while increasing its maximum output.

Another object is to provide a novel filter screen supporting element for strainers of the type referred to above.

Another object is to provide a supporting element for the filter screen of a high pressure separator which element provides a maximum of support for the filter screen while contacting the screen over a minimum area.

These and other objects and advantages of the present invention will become apparent from the following description and the accompanying drawings in which:

Figure 1 is a perspective of a strainer embodying the present invention, certain parts being broken away.

Figure 2 is a fragmentary development of the strainer shown in Fig. 1 looking from the inside of the strainer toward the outside.

Figure 3 is a section taken along the line 3—3 of Fig. 2, certain parts being broken away.

Figure 4 is a section taken along the line 4—4 of Fig. 1.

Figure 5 is a view similar to Fig. 2 of a modification of the present invention.

Figure 6 is a section taken along the line 6—6 of Fig. 5, certain parts being broken away.

Figure 7 is a section taken along the line 7—7 of Fig. 5, certain parts being broken away.

Figure 8 is another view similar to Fig. 2, illustrating a further modification of the invention.

Figure 9 is a section taken along the line 9—9 of Fig. 8, certain parts being broken away.

Figure 10 is a section taken along the line 10—10 of Fig. 8, certain parts being broken away.

The embodiment of the strainer of the present invention illustrated in the drawings is tubular, see Fig. 1, and is especially adapted for use in high pressure juice extractors, such as are commonly used in the food processing industry for expressing juice from tomatoes, pineapples, and the like. In extractors of this type the tubular strainer is rigidly fixed to the extractor frame and has a pressure exerting and product advancing element (not shown), such as a screw rotatably mounted axially therein. The juice and pulp of fruit supplied to the extractor are separated by the cooperative action of the strainer and the screw, the juice being expressed out through the walls of the strainer and the pulp being discharged from one end of the strainer.

The illustrated tubular strainer comprises two substantially identical halves 11 and 13 (Fig. 1). In the following description, only the half 11 will be specifically described, and wherever it is necessary to mention parts of the half 13 they will be designated by the same reference numerals as the corresponding parts of the half 11 with the suffix "a" added. The strainer half 11 comprises a semi-cylindrical, grate-like frame 15 which has a perforated, semi-cylindrical backing plate 17 secured to its concave surface for supporting a semi-cylindrical, fine mesh, filter screen 19 against the high pressures developed within the strainer during the extracting operation.

The semi-cylindrical frame 15 comprises two spaced parallel semi-circular end pieces 21 and 23 which have their corresponding ends rigidly connected by stringers 25 and 27. These end pieces and stringers are braced by a plurality of parallel, longitudinally extending linear ribs 29 and a plurality of parallel, circumferentially extending arcuate ribs 31. The inner surfaces of the end pieces 21 and 23, the stringers 25 and 27, and the ribs 29 and 31 lie in a common semi-cylindrical plane, and thus the frame 15 provides a semi-cylindrical grate-like surface for the support of the semi-cylindrical backing plate 17 against pressures developed within the strainer during operation. The backing plate 17 has a securing frame 33 (Figs. 1 and 4) firmly attached to its margins and said securing frame 33 is rigidly fastened to the grate-like frame 15 by flat head machine screws 35 (Fig. 4). Said screws 35 are countersunk in holes 37 formed in the securing frame 33 and threadedly engaged in holes 38 provided in the end pieces 21 and 23 and the stringers 25 and 27 of said grate-like frame 15.

The perforated backing plate 17 (Fig. 2) is formed from a corrosion resistant metal sheet of a medium gauge by a punching operation which provides a plurality of closely spaced frusto-conical, or tapered protrusions 39 on the inner concave face of the plate and corresponding frusto-conical cavities 40 (Fig. 4) in the outer convex face of the plate. The direction in which the protrusions 39 taper is such that their distal ends 39', i.e., the ends spaced outwardly from the body portion 18 of the plate 17, are smaller than their proximal ends 39'', as clearly shown in Fig. 3. During this punching operation the plate 17 is also provided between the protrusions 39 with a plurality of holes 42 (Fig. 2). Each of the protrusions 39 is provided centrally with a cleanly cut aperture 41 having a flat annular margin 43 (Fig. 2) at the distal end 39' of the protrusion. These flat annular marginal surfaces 43 all lie in a single cylindrical plane which also includes the inner surface of the backing plate securing frame 33 (Fig. 4) and it is upon these coplanar surfaces that the filter screen 19 is supported against the high pressures within the strainer during the extracting operation. The protrusions 39 are arranged in closely spaced rows and the protrusions in adjacent rows are offset from each other to enable the rows to be spaced so closely that the larger, proximal ends 39'' of the protrusions 39 of one row intersect lines tangent to the larger ends 39'' of the protrusions of the rows on either side thereof.

The filter screen 19 is formed from a corrosion resistant metal sheet of a light gauge by a punching operation which provides it with a multiplicity of very fine holes 48 (Fig. 2). Said screen is wider than the backing plate 17 and its lateral margins 49 (Fig. 4) are bent around the lateral edges of the backing plate securing frame 33 and extend radially outward along the stringers 25 and 27. When the two strainer halves 11 and 13 are assembled to form the tubular strainer shown in Fig. 1, the lateral screen margins 49 and 49a are clamped between the frame stringers 25 and 27a (Fig. 4) and 27 and 25a (not shown) thus holding the filter screens 19 and 19a in place on the inner surface of their respective backing plates.

In order to assemble the strainer halves 11 and 13 (Fig. 4) their stringers 25 and 27, and 25a and 27a, respectively, are provided at corresponding points with bosses 51 and 51a having central apertures 53 and 53a. Corresponding ones of said apertures 53 and 53a are adapted for alignment with each other and with apertures 55 and 55a in the filter screens 19 and 19a when the halves 11 and 13 are arranged to form a tube, whereupon said halves may be rigidly secured together by passing tap bolts 57 through the stringer apertures 53 and the screen apertures 55 and 55a and threadedly engaging them with the stringer apertures 53a.

From the above it will be clear that juice forced through the filter screens 19 and 19a in the regions of the backing plate apertures 41 and 41a will immediately pass through said apertures into the flared cavities 40 and 40a on the outerside of the backing plates 17 and 17a from which the juice will freely flow to a collection point below the strainer. It should be noted that the arrangement and size of the frame ribs 29, 31 and 29a, 31a are such that none of the cavities 40 and 40a in the outer face of the backing plates 17 and 17a are completely closed by said ribs and, therefore, the frames 15 and 15a do not obstruct the flow of juice through any of the apertures 41 and 41a in the backing plates. Juice forced through the screens 19 and 19a in the area outside the annular margins 43 and 43a of the apertures 41 and 41a will immediately flow toward the many holes 42 between the protrusions 39 and 39a and will freely drain therethrough to the outer side of the plates 17 and 17a for drainage to the juice collection point. The fact that a few of the holes 42 may be covered by the frame ribs 29 and 31, as shown in Fig. 2, will not noticeably affect the free flow of juice to the outer side of the plate 17 since the number of open holes 42 will always be more than adequate to provide a free drainage of juice through the plate. Thus, juice can pass through every hole in the screen 19 and 19a for free drainage to the outer surface of the strainer, with the exception of those few holes which may be completely blocked by the extremely narrow, annular, screen supporting surfaces 43 and 43a of the backing plates 17 and 17a.

The strainer illustrated in Figs. 5 to 7, inclusive, is the same as the strainer shown in Figs. 1 to 4, inclusive, with the exception that the strainer of Figs. 5 through 7 has a modified form of backing plate 61 incorporated therein. The backing plate 61 (Fig. 5) is formed from a corrosion resistant metal sheet of a medium gauge by a punching operation which provides the plate with a plurality of adjacent apertures 63, each aperture having a flared mouth 65 on the inner concave face of the plate. The margins 67 of the flared mouths 65 are coplanar, hexagonal, and uniformly narrow, and each of the six sides of the margin 67 of each mouth 65 is straight and contiguous with one side of the margin of one of the adjacent mouths 65, thereby presenting a honeycomb surface of intersecting channel-shaped members over the entire plate, see Fig. 5, for supporting the filter screen 19. The punching of these flared-mouth apertures 63 in the inner concave face of the plate 61 forms corresponding tapered protrusions 69 (Figs. 6 and 7) on the outer convex face of the plate. The direction in which each protrusion 69 tapers is away from the body portion 62 of the plate 61, the proximal ends 69' of the protrusions 69 being larger than their distal ends 69''. As shown in Figs. 6 and 7, the distal ends 69'' of some of these protrusions 69 rest on the ribs 29 and 31 of the grate-like strainer frame 15 and in this way the plate 61 is supported at intervals throughout its length and breadth against the pressure developed within the strainer during the juice extraction operation. The arrangement and size of the apertures 63, and the ribs 29 and 31 of the frame 15 are such that none of the apertures 63 are completely blocked by said ribs, and, therefore, the frame 15 does not obstruct the flow of juice through any of the apertures. Therefore, juice forced through the screen 19 will pass into the contiguous apertures 63 and flow freely therethrough to the outer side of the strainer. Thus, juice can pass through every hole in the screen 19 for free drainage to the outer surface of the modified form of strainer, with the exception of those few holes which may be completely blocked by the extremely narrow, screen supporting, marginal surfaces 67 of the flared aperture mouths 65, each of which surfaces 67 is so narrow that it establishes substantially linear engagement with the screen 19.

Even less area of contact with the screen 19 is made by the backing plate 81 in the modification of the invention illustrated in Figs. 8, 9 and 10. The backing plate 81 closely resembles the backing plate 61, in that the plate 81 includes a body portion 83 having protrusions 85 extending to one side thereof. The protrusions 85 are of tapering form, their proximal ends 85' being larger than their distal ends 85''. Each protrusion 85 is hollow, and open at both ends, as in the case of the backing plate 61, thus providing tapering mouths 87 in the side of the plate 81 opposite that having the protrusions 85. The protrusions 85 are of hexagonal cross section, and are arranged in straight rows so closely spaced that each of the six sides of the base, or larger end, of one protrusion 85 is defined by channel-shaped members having a narrow surface 89 which is arcuate both longitudinally and in cross section (see Fig. 10) and which likewise defines one of the six sides of the base of an adjacent protrusion 85 (see Fig. 8). Whereas the corresponding surfaces 67 of the previously described backing plate 61 are substantially straight and lie in a common, substantially flat plane, so that each engages the screen 19 throughout its entire length, in the case of the backing plate 81, the surfaces 89 extend in a curved line (see Fig. 9) between two of the angles 91 of the hexagon defined by the larger end 85' of a protrusion 85. Hence, only point contact is established between the backing plate 81 and the screen 19, each point of contact being at the intersection of three of the surfaces 89, as clearly shown in Fig. 8.

Thus it may be seen that the form of backing plate 81 shown in Figs. 8, 9, and 10 makes for maximum filtering or straining efficiency, since it minimizes, if it does not in fact eliminate the obstruction of apertures 48 of the screen 19 supported thereby.

Whereas the protrusions 69 and 85, and their corresponding flared mouths 65 and 87 respectively, have been illustrated and described as being of hexagonal form, it is to be understood that they may be of other polygonal cross sectional form (e.g.: triangular) and still remain within the scope of the invention. Moreover, while three preferred embodiments of the present invention have been shown and described, it will be understood that further changes may be made in the details thereof without departing from the spirit and scope of the appended claim.

The invention having been thus described, that which is believed to be new and for which protection is desired by Letters Patent, is:

A support for a strainer screen comprising a plate, hollow open-ended tapering protrusions projecting from one side of said plate, the proximal ends of the protrusions being polygonal, said protrusions being spaced apart and arranged in rows, the polygons defined by the proximal ends of the protrusions of one row extending into the spaces between the polygons defined by the proximal ends of the protrusions of adjacent rows, said protrusions defining zigzag channels between adjacent rows of protrusions intersecting each other adjacent the corners of said protrusions, and peaks projecting from the other side of the plate at the corners of said polygons, the sides of said polygons between said peaks being bowed in the direction in which the protrusions extend.

(References on following page)

References Cited in the file of this patent

UNITED STATES PATENTS

| | | |
|---|---|---|
| Re. 20,432 | Roberts | June 29, 1937 |
| 830,230 | Hoffbauer | Sept. 4, 1906 |
| 858,154 | Conversy | June 25, 1907 |
| 2,536,054 | Harrington | Jan. 2, 1951 |
| 2,562,328 | Null | July 31, 1951 |

FOREIGN PATENTS

| | | |
|---|---|---|
| 526,363 | Germany | Mar. 21, 1929 |
| 91,517 | Sweden | Feb. 17, 1938 |